United States Patent
Grann et al.

(10) Patent No.: US 8,729,768 B2
(45) Date of Patent: May 20, 2014

(54) ROTOR MADE OF MAGNETIC MATERIAL

(75) Inventors: Helge Grann, Bjerringbro (DK); Uffe Staehr, Hinnerup (DK); Oluf Kjaer, Bjerringbro (DK)

(73) Assignee: Grundfos Management a/s, Bjerringbro (DK)

( * ) Notice: Subject to any disclaimer, the term of this patent is extended or adjusted under 35 U.S.C. 154(b) by 250 days.

(21) Appl. No.: 13/144,325

(22) PCT Filed: Jan. 8, 2010

(86) PCT No.: PCT/EP2010/000047
§ 371 (c)(1),
(2), (4) Date: Jul. 13, 2011

(87) PCT Pub. No.: WO2010/081653
PCT Pub. Date: Jul. 22, 2010

(65) Prior Publication Data
US 2011/0260575 A1    Oct. 27, 2011

(30) Foreign Application Priority Data
Jan. 14, 2009  (EP) ............................ 09000401

(51) Int. Cl.
*H02K 1/22*  (2006.01)
(52) U.S. Cl.
USPC .................................................... 310/261.1
(58) Field of Classification Search
USPC .................... 310/156.01–156.84, 261.1, 262
See application file for complete search history.

(56) References Cited

U.S. PATENT DOCUMENTS

| | | | |
|---|---|---|---|
| 6,145,941 A | 11/2000 | Anderton et al. | |
| 6,235,415 B1 | 5/2001 | Ogawa et al. | |
| 2003/0042804 A1 * | 3/2003 | Cook et al. | 310/51 |
| 2004/0016239 A1 | 1/2004 | Fabian et al. | |
| 2006/0113847 A1 * | 6/2006 | Randall et al. | 310/12 |
| 2006/0158053 A1 * | 7/2006 | Aschoff et al. | 310/91 |
| 2008/0199334 A1 | 8/2008 | Sorensen | |

FOREIGN PATENT DOCUMENTS

| | | |
|---|---|---|
| AU | 23626/70 A | 6/1972 |
| DE | 10006426 A1 | 11/2000 |
| EP | 0523353 A1 | 1/1993 |
| EP | 0579560 A1 | 1/1994 |
| EP | 1281881 A1 | 2/2003 |
| EP | 1496277 A2 | 1/2005 |
| EP | 1705259 A1 | 9/2006 |
| EP | 1719916 A1 | 11/2006 |
| EP | 1843449 A1 | 10/2007 |
| EP | 1903229 A2 | 3/2008 |
| EP | 2103711 A1 | 9/2009 |
| WO | 2004113670 A2 | 12/2004 |
| WO | 2008081650 A1 | 7/2008 |

OTHER PUBLICATIONS

Int'l Search Report issued Feb. 3, 2010 in Int'l Application No. PCT/EP2010/000047.

* cited by examiner

*Primary Examiner* — Hanh Nguyen
(74) *Attorney, Agent, or Firm* — Panitch Schwarze Belisario & Nadel LLP

(57) ABSTRACT

The invention relates to a rotor including a magnetic material. At least one surface section of the magnetic material is provided with a wear-resistant coating.

12 Claims, 8 Drawing Sheets

ROTOR MADE OF MAGNETIC MATERIAL

CROSS-REFERENCE TO RELATED APPLICATIONS

This application is a Section 371 of International Application No. PCT/EP2010/000047, filed Jan. 8, 2010, which was published in the German language on Jul. 22, 2010, under International Publication No. WO 2010/081653 A1 and the disclosure of which is incorporated herein by reference.

BACKGROUND OF THE INVENTION

Rotors which must have magnetic characteristics are used in electric motors. For this, for permanent magnet motors, it is known to embed permanent magnets into a rotor. Moreover, it is known from EP 17 199 16 A1 to design the rotor in a shaftless manner and completely of magnetic material, wherein then the individual magnets of the rotor are formed by way of a suitable magnetization of the magnetic material in the rotor.

The rotor must be mounted in the electric motor in the axial and radial direction. Thereby, as the case may be, it is not only the forces produced by the rotor itself, but also the external forces which are transmitted from elements connected to the rotor onto the rotor, which need to be accommodated by the bearings. For example, it may be the case in a pump assembly that the axial forces caused by the impeller and also the radial forces acting on the impeller must be transmitted directly onto the rotor of the electric motor and be accommodated by its mounting.

With a rotor which is formed completely of magnetic material, under certain circumstances it is difficult to design the bearings in a sufficiently strong manner, in order to be able to accommodate the occurring forces. For this reason, it is known from EP 17 199 16 A1 to embed additional bearing sleeves into the magnetic material. This however entails increased manufacturing and assembly costs.

BRIEF SUMMARY OF THE INVENTION

It is therefore an objective of a preferred embodiment of the present invention to provide a simplified rotor of magnetic material which is inexpensive to manufacture and moreover permits an adequately stable mounting.

An objective of a preferred embodiment of the present invention is achieved by a rotor including a magnetic material, at least one surface section of the magnetic material being provided with a wear-resistant coating. Preferred embodiments of the present invention are to be deduced from the subsequent description as well as the attached figures.

The rotor according to a preferred embodiment of the present invention includes a magnetic material. Individual rotor poles may be formed in the magnet material by magnetization. At least one surface section of the magnetic material is provided with a wear-resistant coating, in order to increase the wear-resistance at least on the individual sections, for example the regions which serve as bearings. For example, a thin layer of another material which has the desired wear-resistance and, as the case may be, the desired hardness, is deposited onto this surface section. The coating may be deposited onto the magnetic material by way of a suitable method, for example PVD (physical vapor deposition), CVD (chemical vapor deposition), ion-beam assisted deposition (IBAD) or PCVD (plasma chemical vapor deposition). The wear-resistant coating provides the surface section of the magnetic material with the necessary wear-resistant characteristics, so that this surface section may serve for example for mounting the rotor. The coating thereby is significantly harder and/or more wear-resistant than the magnetic material itself, for example if it is the case of a ferrite material, which does not have the desired characteristics.

According to a preferred embodiment, the rotor is manufactured completely of the magnetic material. For example, particularly preferably, the rotor has no separate rotor shaft, but is manufactured as one piece from the magnetic material. The poles of the rotor are then formed by way of a suitable magnetization of sections in the magnetic material. According to a preferred embodiment of the present invention, the complete rotor or one or more surface sections of the rotor are then provided with a wear-resistant coating. These may be surface sections which serve as bearings. Alternatively, one may also provide other surface sections or the complete rotor with a wear-resistant coating, for example if the rotor comes into contact with an aggressive or abrasive medium. With the coating according to a preferred embodiment of the present invention, the advantage lies in the fact that no separate bearing shells or bearing elements need to be assembled or integrated on or in the rotor, by which means the manufacture is significantly simplified and becomes less expensive. Moreover, the share of magnetic material in the rotor may be maximized when one makes do without separate bearing shells, by which means the magnetic characteristics of the rotor may be improved and the efficiency increased.

Preferably, the rotor is part of an electric motor, and further preferably of an electrical drive motor of a pump assembly. It is indeed with pump assembles, for example heating circulation pump assembles which are manufactured in large batch numbers, that it is of interest to be able to manufacture the rotor in an as simple as possible manner. Simultaneously, with such pumps which often run in permanent operation, it is the case of maximizing the efficiency, in order to keep the energy consumption low. For this reason, it is desirable to optimize the magnetic characteristics of the rotor as much as possible.

The coating is preferably of DLC (diamond-like carbon) (i.e. carbon similar to diamond), CrN (chromium nitride) and/or TiAlN (titanium aluminum nitride). With the DLC coating, it may be one or more of tetrahedral amorphous carbon (ta-C), a hydrogen-containing amorphous carbon layer (amorphous hydrogenated carbon (a-C:H)), or a tetrahedral-bonded-hydrogen-containing amorphous carbon layer (ta-C:H). These coating materials may be deposited alone or in combination, in order to form the wear-resistant coating of the magnetic material. However, one may also use any other suitable coating materials alone or in combination, in particular also with one of the previously mentioned materials. The selection of the coating material depends on the one hand on the desired characteristics of the coating, in particular on the desired wear-resistance, and on the other hand on the magnetic material, in order to permit a firm connection between the coating and the magnetic material.

According to a preferred embodiment, the coating is formed at least in a two-layered manner. One may achieve a particular wear resistance by way of such a design. Moreover, it is also possible to improve the bonding between the coating and the magnetic material. The magnetic materials which are usually used for the rotors, for example ferrite, may not be provided with a common wear-resistant coating without delay. This problem may be solved by way of a multi-layered construction of the coating. For example, firstly one may deposit a layer which connects particularly well to the magnetic material, and which is simultaneously a suitable carrier material for the wear-resistant layer to be deposited. Thus, this first layer may achieve a bonding between the magnetic material and the actual wear-resistant layer. Moreover, the layer may also improve the coating process. Thus the first deposited layer may, for example, be electrically conductive, so that this layer then permits the further coating with the wear-resistant material in the conventional way and manner, e.g. with the PVD method. The coating of the magnetic material which is not electrically conductive may be effected in this manner.

Whereas the inner layer which is deposited directly onto the magnetic material is thus preferably electrically conductive, the outer layer of the coating is preferably formed of a highly wear-resistant material with further preferably low friction. This layer then, for example, forms a layer which is ideal for the bearing region of the rotor, i.e. the region, in which the rotor is mounted in the radial and/or axial direction. Such a highly wear-resistant layer also forms a suitable counter-piece for surrounding, hard bearing shells which are manufactured, for example, from Al2O3. One may achieve bearing pairings in this manner, which on the one hand are highly wear-resistant and therefore quite durable, and on the other hand are capable of accommodating high forces.

Preferably, the coating is designed in a three-layered manner with a middle carrier layer. Thus the inner layer, as described above, may preferably be electrically conductive and thus firstly create the basic coating capability of the magnetic material which is not electrically conductive. The middle layer which is subsequently deposited onto the inner layer forms a carrier layer or bonding layer, which creates the bonding between the electrically conductive inner layer and the outer layer which is subsequently to be deposited. The outer layer then, as previously described, is formed from a highly wear-resistant material preferably with a low friction.

The inner layer is preferably at least partly formed from CrN or a corrosion-resistant metal. Such a layer is electrically conductive and permits the coating, for example, with the PVD method, in order to then deposit further layers, in particular the highly wear-resistant outer layer.

The outer layer is preferably at least partly formed of DLC, CrN or TiAlN. These are materials which have a high-wear resistance.

As previously described, preferably at least one section of the rotor which forms a bearing surface is provided with a coating according to the preceding description. Further preferably, the entire rotor may also be coated in this manner, for example in order to ensure a corrosion-resistance of the rotor. One may then make do without an additional encasing or encapsulation of the rotor, for example with a casing of stainless steel, in this manner. On the one hand, the manufacture of the rotor is simplified by way of this coating and, on the other hand, the magnetic characteristics of the rotor are also improved, since a thin coating compromises the magnetic field to a lesser extent that an additional casing which surrounds the rotor at its outer periphery.

The bearing surface may, for example, be formed preferably also on an axial extension of the rotor. This axial extension which projects in the axial direction, i.e. in the direction of the rotation axis of the rotor, on at least one end-side, thus forms a rotor shaft. However, the axial extension is preferably designed as one piece likewise of magnetic material with the rest of the rotor. Such a section preferably serves for mounting the rotor, in particular in the radial direction, and, as the case may be, serves for connecting components to be driven by the rotor, for example a pump impeller, to the rotor. Specifically, this projecting section assumes the function of a rotor shaft.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
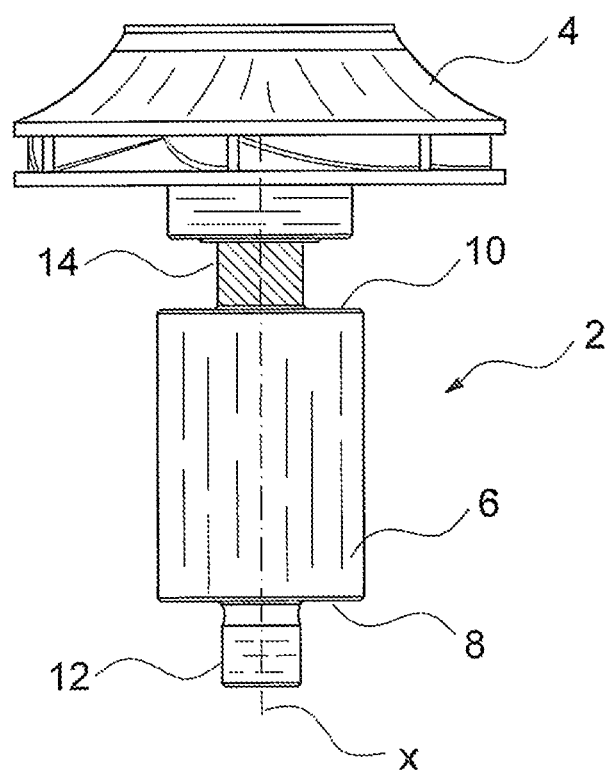
FIG. 1 is a lateral view of a rotor of a pump assembly according to a first preferred embodiment of the present invention.

FIGS. 1 to 6 show rotors of pump assemblies with which different regions are coated. The rotors of the pump assemblies include the actual rotor 2 which forms the rotor of an electric motor which serves as a drive motor for the pump assembly. The impellers 4 of the pump assemblies are attached onto the rotor 2, so that each impeller 4 is driven by the rotor 2 or rotates together with the rotor 2. The rotor 2 includes a central section 6 which, in the assembled condition of the drive motor, is located in the inside of the surrounding stator (not shown here). Axial, shaft-like projections 12 and 14 extend from the axial end-sides 8 and 10 of the central section 6. The projections 12 and 14 are designed as one piece with the central section 6 of the rotor from magnetic material and extend concentrically to the longitudinal axis or rotation axis X of the rotor. These projections 12, 14 assume the function of the rotor shaft and serve for the mounting and, in the case of the projection 14, serve for the connection to the impeller 4. In one embodiment, each rotor 2 is manufactured completely and of one piece from magnetic material, for example ferrite. According to a preferred embodiment of the present invention, a coating of the surface of the magnetic material is provided, in order to give the surface of the rotor 2 a desired wear-resistance or hardness, which in particular permits the direct application as a bearing surface. This coating may be formed on different regions.

In a first preferred embodiment, shown in FIG. 1, the peripheral section of the axial projection 14 is provided with the coating. The axial projection 14 thus forms a radial mounting for the rotor 2. Since the impeller 4 is connected to the rotor 2 via the projection 14 in a fixed manner, this radial mounting also assumes the bearing function for the impeller 4.

Figure 2:
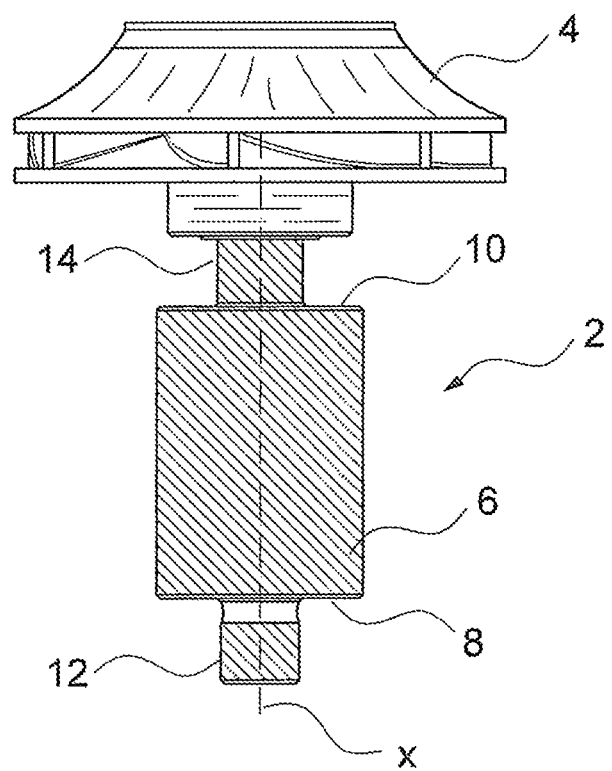
FIG. 2 is a lateral view of a rotor of a pump assembly according to a second preferred embodiment of the present invention.

According to a second embodiment, which is shown in FIG. 2, apart from the peripheral region or the outer periphery of the projection 14, the outer periphery of the projection 12 as well as the outer periphery of the central section 6 of the rotor 2 is also provided with a wear-resistant coating. With this embodiment, the outer periphery of the projection 14 as well as the outer periphery of the projection 12 serves as a radial bearing. The outer periphery of the central section 6 is likewise coated with a wear-resistant coating, in order to give the rotor a necessary wear-resistance also in this region, which may be necessary, in order to protect the central section 6 of the rotor from corrosion and damage due to surrounding media, in particular if it is the case of a wet-running motor.

Figure 3:
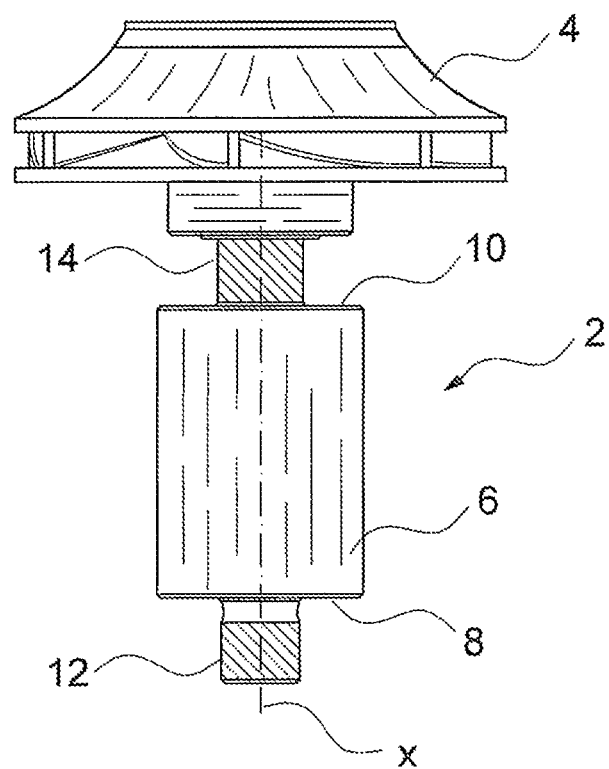
FIG. 3 is a lateral view of a rotor of a pump assembly according to a preferred embodiment of the present invention.

According to a further preferred embodiment, shown in FIG. 3, only the peripheral surfaces of the projections 12 and 14 are coated, which as previously described serve as radial bearings.

Figure 4A:
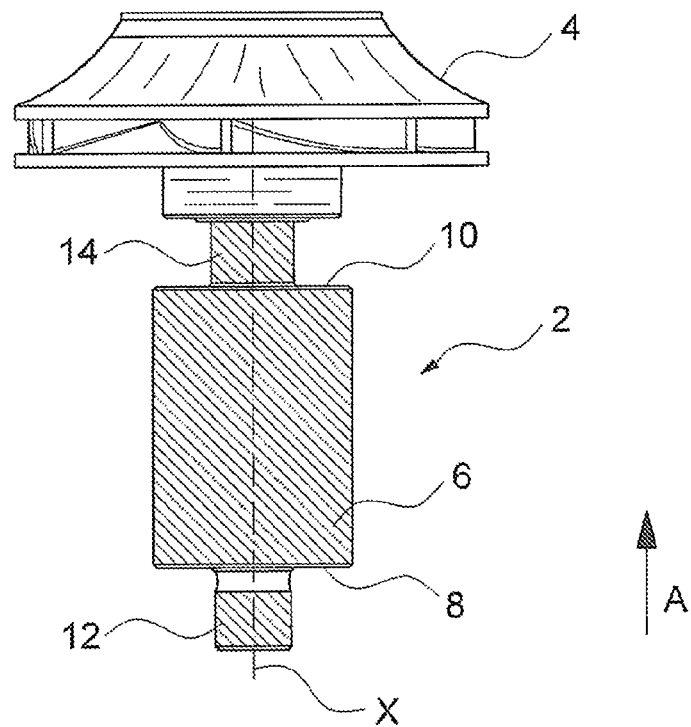
FIG. 4a is a lateral view of a rotor of a pump assembly according to a fourth preferred embodiment of the present invention.
Figure 4B:
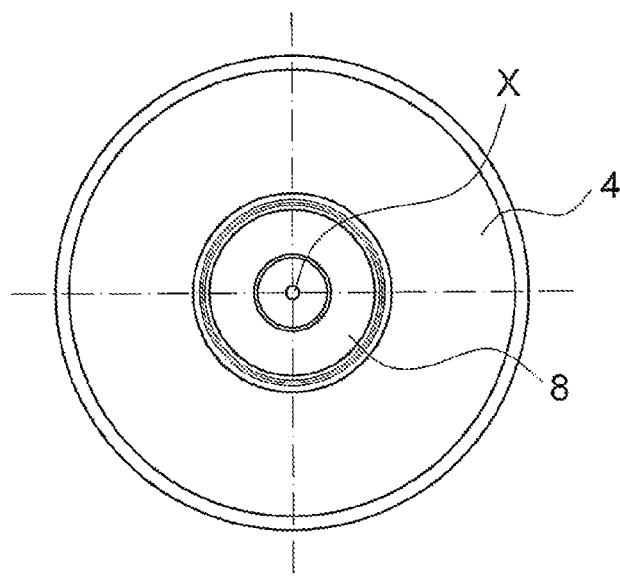
FIG. 4b is an axial plan view of the rotor according to FIG. 4a in the direction of the arrow A.

A further preferred embodiment, shown in FIGS. 4a and 4b, corresponds essentially to the embodiment according to FIG. 2, with the difference being that with the embodiment according to FIG. 4, as is to be seen in FIG. 4b, also the axial end-side 8 of the rotor 2 is provided with the wear-resistant coating. Thus, the axial end-side of the central section 6 of the rotor 2 may serve as a thrust bearing surface.

Figure 5A:
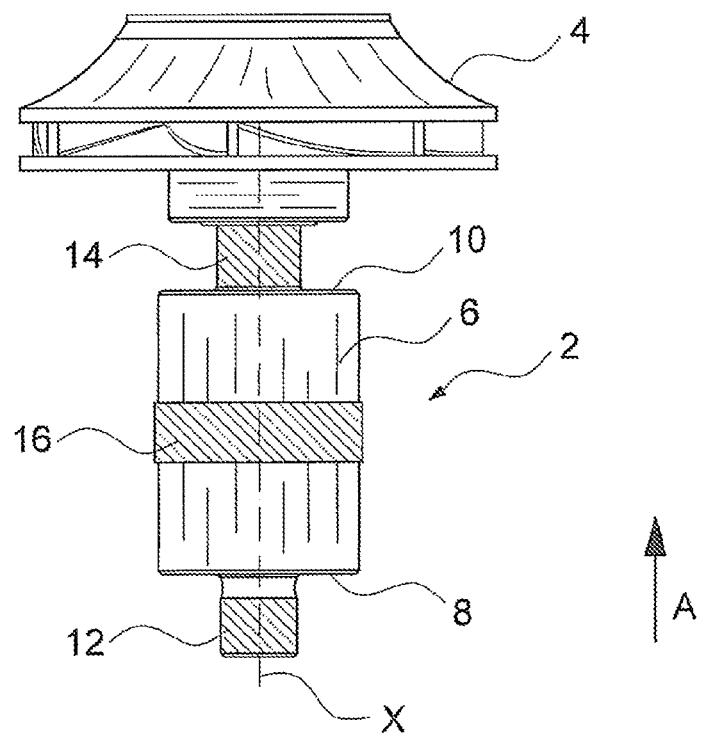
FIG. 5a is a lateral view of a rotor of a pump assembly according to a fifth preferred embodiment of the present invention.
Figure 5B:
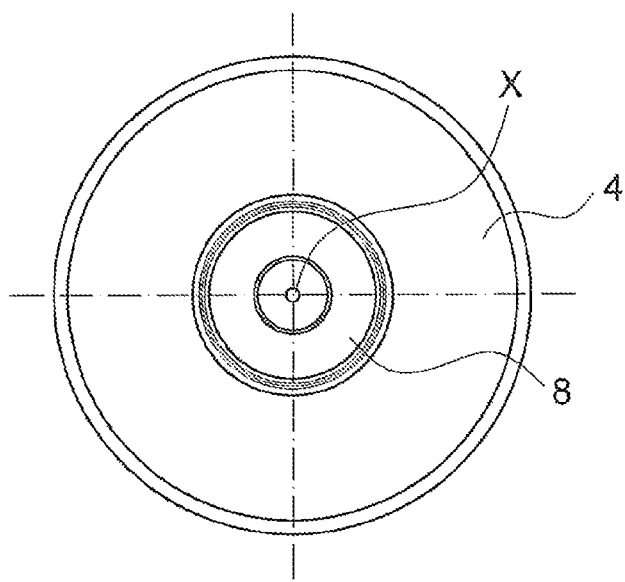
FIG. 5b is an axial plan view of the rotor according to FIG. 5a in the direction of the arrow A.

The embodiments according to FIGS. 5a and 5b correspond essentially to the embodiment according to FIG. 4, with the difference being that the outer periphery surface of the central section 6 of the rotor 2 is not completely provided with the wear-resistant coating. With the embodiment according to FIG. 5, as is to be seen in FIG. 5a, only an annular section 16 on the outer periphery of the central section 6 is provided with the coating. This annular section 16 is situated in the axial direction X in the middle region of the central section 6. There, it may form a radial emergency bearing surface and protect the rotor from wear, in the case that it should come in contact with the surrounding stator or a surrounding can.

Figure 6:
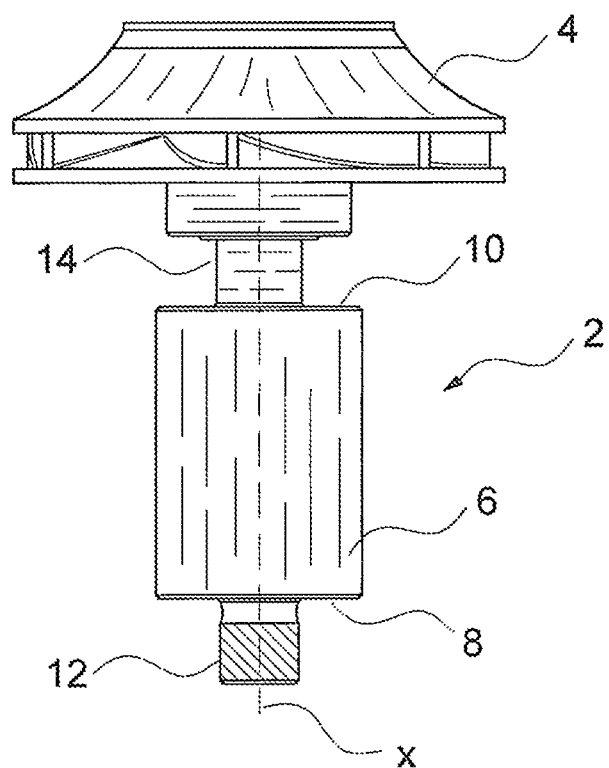
FIG. 6 is a lateral view of a rotor of a pump assembly according to a sixth preferred embodiment of the present invention.

A further preferred embodiment, shown in FIG. 6, corresponds essentially to the embodiment according to FIG. 1, with the difference being that with the embodiment according to FIG. 6, it is not the projection 14, but the projection 12 which is provided with the wear-resistant coating on its peripheral wall. Thus, according to the embodiment of FIG. 6, the projection 12 serves as a radial bearing for the rotor 2.

Figure 7:
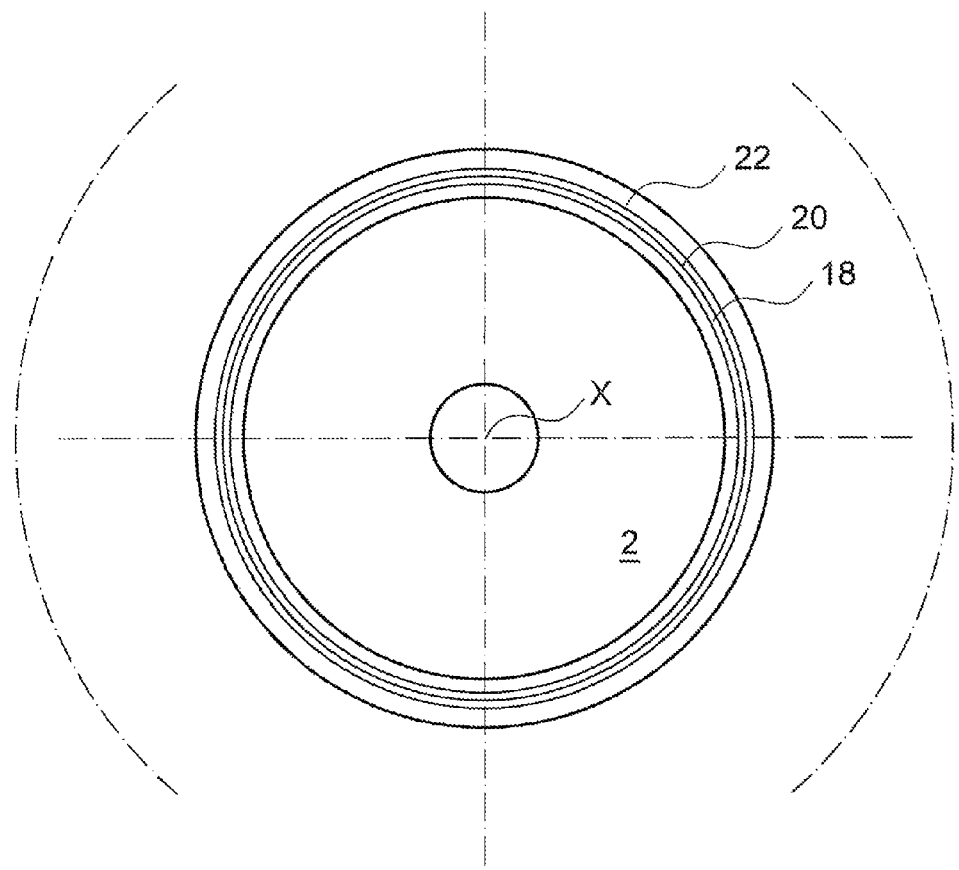
FIG. 7 is a schematic section of a rotor with a coating according to a further preferred embodiment of the invention.

The construction of the previously mentioned coating is explained in more detail by way of FIG. 7, wherein it is to be understood that all of the previously mentioned regions which may be provided with a wear-resistant coating, may be designed in this manner.

FIG. 7 shows a sectioned view through a coated region of the rotor 2. The rotor 2 is formed of a magnetic material, for example of ferrite or neodymium, wherein the rotor poles are formed in the magnetic material by way of a suitable magnetizations. The outer peripheral surface of the rotor 2 is firstly coated with an inner layer 18 which is electrically conductive. This layer may for example include CrN (chromium nitride). A middle or intermediate layer 20 which forms a carrier layer for the outer layer 22 is deposited on the outside onto the inner layer 18. The intermediate layer 20 is designed, for example, of CrCN and may be deposited onto the electrically conductive inner layer 18 with the PVD method. The electrically conductive inner layer 18, thus, straight away permits the application of the common coating methods in order to deposit suitable hard material layers onto the magnetic material of the rotor 2. The magnetic material would not be able to be coated alone by way of the usual methods. As an outer layer 22, the highly wear-resistant layer which may serve as a bearing surface for the rotor 2 may then be formed onto the intermediate layer 20. The outer layer 22 thereby preferably includes one or more of DLC (diamond-like carbon), CrN (chromium nitride) or TiAlN (titanium aluminium nitride). This layer has a higher wear-resistance and a low friction, and thus favorable bearing characteristics for example in a pairing with a surrounding bearing sleeve of Al2O3.

Instead of depositing several layers one after the other in steps, one or more layers with stepped or changing characteristics in the radial direction may also be provided. Thus, a stepped or a flowing transition between the individual materials or material characteristics may be achieved. With this design, the individual layers are not clearly separated from one another but merge into one another in a stepped or flowing manner.

Figure 8:
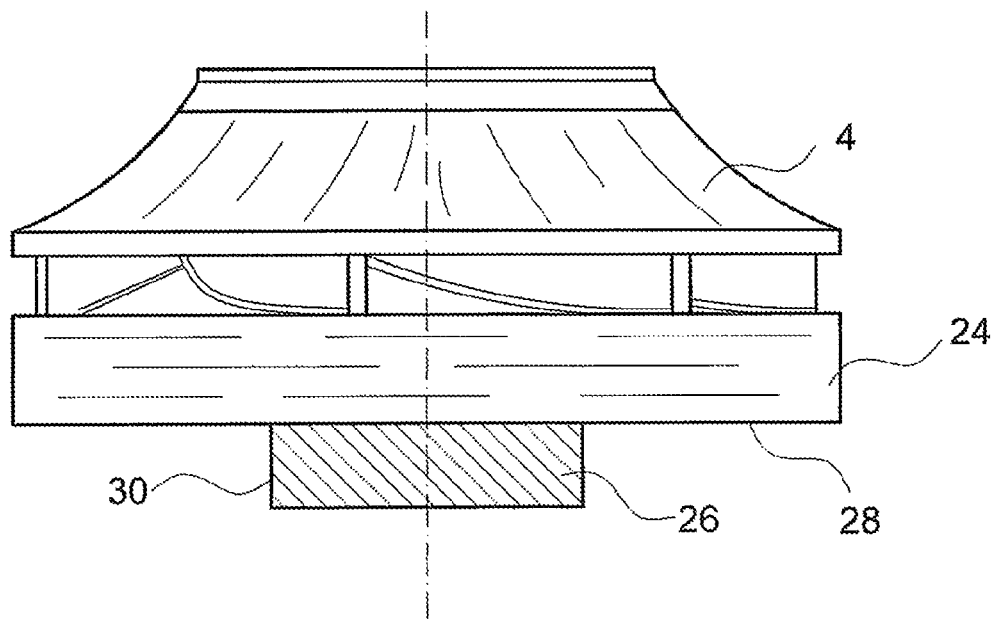
FIG. 8 is a schematic view of a rotor according to a further preferred embodiment of the present invention.

FIG. 8 shows an impeller 4 with a magnetic rotor 24 of an electric motor which is attached in a direct manner. With regard to this, it is the case of a rotor 24 with an axially directed magnetic flux, i.e. the associated stator lies opposite the rotor 24 at the end-side and not peripherally. This rotor 24 is also designed as one piece of magnetic material. The rotor 24 has an axial extension 26 which forms a shaft stub for the radial guidance of the rotor 24 and of the attached impeller 4. With this rotor 24, the annular end-side 28 which surrounds the axial extension 26, and the peripheral surface 30 of the extension 26, are designed as bearing surfaces. The end-side 28 forms a thrust bearing surface 28 and the peripheral surface 30 forms a radial bearing surface. The end-side 28 and the peripheral surface 30 thereby are provided with a wear-resistant coating in the previously described manner.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A rotor (2) comprising a magnetic material, at least one surface section of the magnetic material being provided with a wear-resistant coating (18, 20, 22),
wherein the coating (18, 20, 22) is designed in an at least two-layered manner and comprises (i) an inner (18) layer which is deposited directly onto the magnetic material and which is electrically conductive and (ii) an outer layer (22) of a highly wear-resistant material.

2. The rotor (2) according to claim 1, wherein the rotor is completely manufactured of the magnetic material.

3. The rotor (2) according to claim 1, wherein the rotor is part of an electric motor.

4. The rotor (2) according to claim 1, wherein the rotor is part of an electrical drive motor of a pump assembly.

5. The rotor (2) according to claim 1, wherein the coating (18, 20, 22) is formed of one or more materials selected from DLC, CrN and TiAlN.

6. The rotor according to claim 1, wherein the outer layer (22) has a low friction.

7. The rotor according to claim 1, wherein the coating (18, 20, 22) comprises a three-layered structure with a middle carrier layer (20).

8. The rotor according to claim 1, wherein the outer layer (22) is at least partly formed from DLC, CrN or TiAlN.

9. The rotor according to claim 1, wherein at least one section (8, 12, 14) of the rotor (2) which forms a bearing surface is provided with the coating.

10. The rotor according to claim 9, wherein the bearing surface is designed on an axial extension (12, 14) of the rotor (2).

11. A rotor (2) comprising a magnetic material, at least one surface section of the magnetic material being provided with a wear-resistant coating (18, 20, 22), wherein the coating (18, 20, 22) is designed in an at least two-layered manner and wherein the coating (18, 20, 22) comprises an inner (18) layer which is deposited directly onto the magnetic material and which is electrically conductive.

12. The rotor according to claim 11, wherein the inner layer (18) is formed at least partly of CrN or a corrosion-resistant metal.

* * * * *